C. E. BRADLEY.
METHOD OF MANUFACTURING RUBBER ARTICLES.
APPLICATION FILED APR. 20, 1918. RENEWED JULY 15, 1920.
1,367,731.
Patented Feb. 8, 1921.
2 SHEETS—SHEET 2.
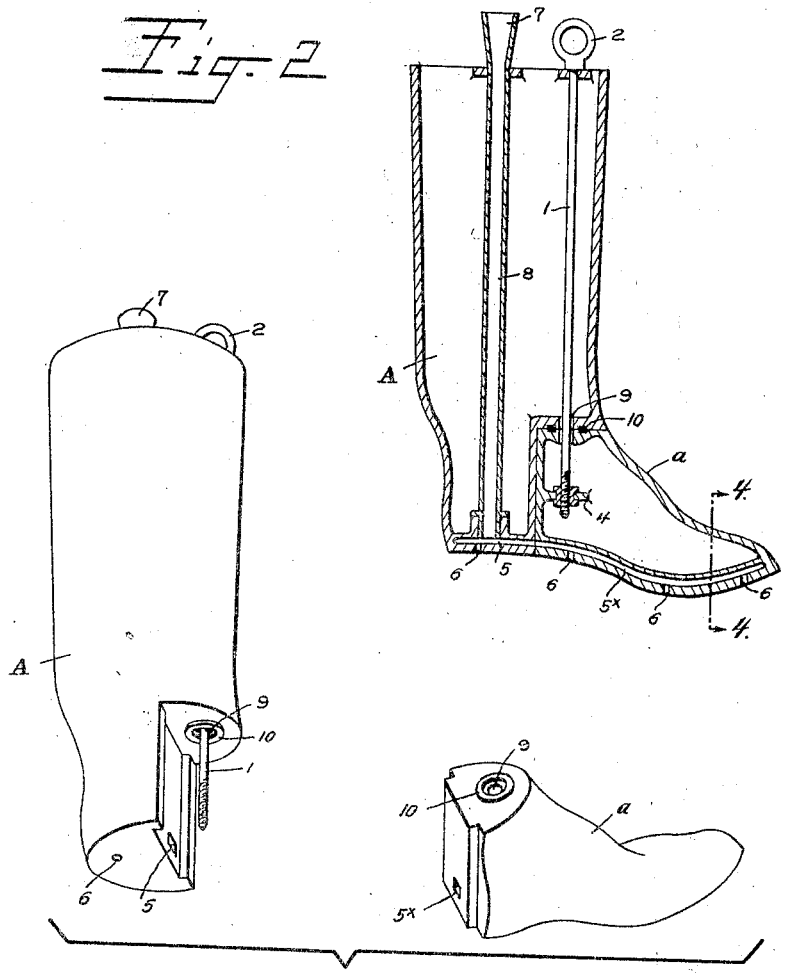
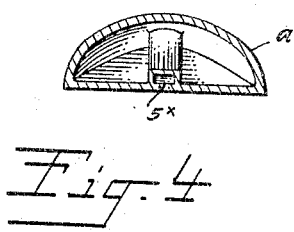
Inventor
Charles E. Bradley,
By his Attorney.

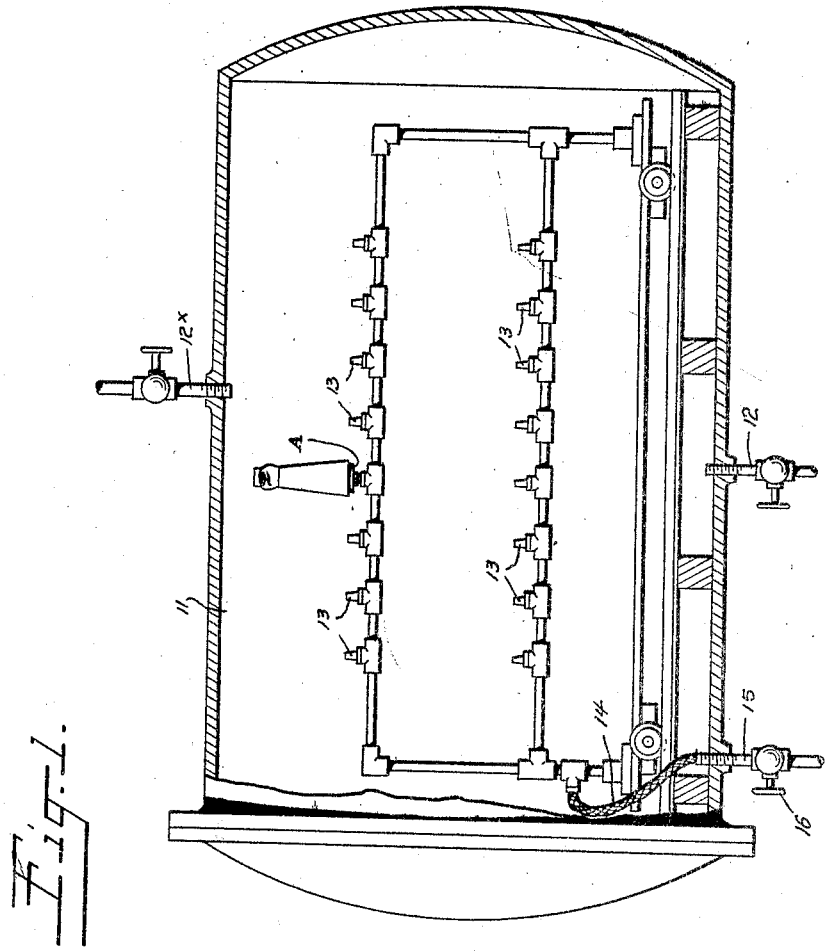

UNITED STATES PATENT OFFICE.

CHARLES E. BRADLEY, OF MONTCLAIR, NEW JERSEY, ASSIGNOR TO THE GOODYEAR'S METALLIC RUBBER SHOE COMPANY, A CORPORATION OF CONNECTICUT.

METHOD OF MANUFACTURING RUBBER ARTICLES.

1,367,731.   Specification of Letters Patent.   Patented Feb. 8, 1921.

Application filed April 20, 1918, Serial No. 229,723. Renewed July 15, 1920. Serial No. 396,612.

*To all whom it may concern:*

Be it known that I, CHARLES E. BRADLEY, a citizen of the United States, residing at Montclair, in the county of Essex and State of New Jersey, have invented certain new and useful Improvements in Methods of Manufacturing Rubber Articles, of which the following is a full, clear, and exact description.

This invention relates to the method of manufacturing articles of rubber, and more particularly to the vulcanization step in the manufacture of rubber footwear. The object of the invention is to provide a method of treating the built up boots on a form or last whereby the vulcanization may be effected by subjecting them to the action of steam.

In my application filed August 3, 1917, Serial Number 184,220, I disclosed a method of vulcanizing hollow articles upon hollow forms in such manner as to prevent spotting of the article by condensation of the steam thereon, which condensation is caused by the cold forms, the method comprising an initial circulation of a heating medium within the form while maintaining the opposite side of the form free from contact with the steam, and subsequently subjecting the opposite side to steam at a vulcanizing temperature while subjecting the interior of the form and article to a lesser pressure.

By the present invention I provide a method of utilizing steam as a vulcanizing medium in the manufacture of rubber boots and shoes and other articles which consists in treating the article by the application of steam applied directly to one side thereof simultaneously with its application by conduction to the opposite side thereof, while subjecting the side subject to treatment by conduction to lesser pressure.

By the present invention steam may be employed as a vulcanizing medium without danger of spotting of the article. Furthermore the method reduces the time of curing, inasmuch as it enables the vulcanizing medium to be applied simultaneously to both sides of the stock; and the method possesses further utility as will hereinafter be pointed out.

In the accompanying drawings I have shown an apparatus suitable for carrying out my invention, the same forming the subject matter of a separate application.

Referring to the drawings,

Figure 1 is a sectional elevation of a vulcanizing chamber with a boot-supporting rack-car therein.

Fig. 2 is a sectional elevation of a boot last.

Fig. 3 is a perspective view of the two last members separated.

Fig. 4 is a transverse section through the last on the line 4—4, Fig. 2.

In carrying out my method the boot is built up according to the usual practice upon a hollow last A having a separable toe member $a$ to permit the removal of the last from the finished boot. The members A and $a$ are connected together by means of a bolt 1, the bolt having a thumb piece 2, and its lower end being threaded in a bracket 4 secured within the toe $a$. At the base of the last member A is constructed a shallow tube or duct 5 which, when the two last members are assembled, is in register with a similar tube or duct $5^x$ constructed in the base of the member $a$. The bottom wall of the duct, in each case, is the sole of the last, and the said sole is formed with a number of perforations 6 for communication between the duct and the exterior of the sole. At the top of the last, projects a tapered nipple 7 at the end of a pipe 8 which extends through the last and into communication with the duct 5, $5^x$. Communication between the interior of last member A and the interior of last member $a$ is effected through a port 9, surrounding bolt 1, and a tight joint between the last members at the point surrounding the said port is effected by means of a heat-proof packing 10.

The vulcanizing chamber 11 is in communication with a steam pipe 12, and is adapted to receive a rack-car, the rack of which may be built up of a hollow piping which communicates with the nipples 13, each of which is adapted to receive the tapered bushing 7 in the end of a last. The hollow piping of the rack is provided with a flexible connection 14 which is adapted to be coupled to a pipe 15 for providing a differential of pressures between the surface of the boot and the interior thereof as will later more fully appear.

In carrying out the method as applied to rubber boots, the lasts upon which the unvulcanized boots are built up are placed upon the nipples 13 of the rack, the rack-car is placed within the vulcanizing chamber 11, and the latter is sealed. Thereupon the air in the chamber may be withdrawn through suction pipe 12ˣ and steam is introduced through the pipe 12, the steam passing into direct contact with each boot, and simultaneously into the interior of each last, through the opening about bushing 7 and thence through port 9, so that the boot supported by the last will be subjected to heat applied directly to one side thereof and by conduction through the walls of the last to the opposite side thereof.

In carrying out the vulcanization, I subject the interior of the article supported upon the last to a lesser pressure than that of the surrounding steam. This is effected by opening the valve 16 of pipe 15 whereby the interior of the article may be brought into communication with a lesser pressure through perforations 6, duct 5, 5ˣ, tube 8 and bushing 7. But contrary to the usual method of vulcanizing under differential, the lesser pressure assists the vulcanizing action of steam within the last, inasmuch as the article will be caused to hug the walls of the last and thereby to receive the full effect of the heat by conduction.

By my method, the tendency of the sole of a rubber boot to resist vulcanization is overcome. It is common in the construction of such soles to introduce a layer of "rag stock" intermediate the inner and outer soles. This rag stock contains a large proportion of cotton and forms an insulator; therefore the filling piece resists the conduction of heat from the exterior of the sole to the inner sole. But in the present method the rag stock does not obstruct vulcanization of the sole, inasmuch as the heating medium is applied from the interior of the last to the inner sole by conduction through the metal.

Not only may steam be employed as the vulcanizing agent by means of the present method, without danger of spotting the article, but vulcanization may be effected in much shorter time than is possible by the use of any method heretofore employed.

Having thus described my invention, what I claim as new and desire to protect by Letters Patent:

1. The method of vulcanizing articles containing rubber, which consists in treating the article by the application of a heating medium applied directly to one side thereof and through a heat conductor to the opposite side thereof, while subjecting the interior of the article to a lesser pressure independent of and simultaneously with the application of the heating medium through the heat conductor.

2. The method of vulcanizing articles containing rubber, which consists in treating the article by the application of a heating medium applied to opposite sides thereof while subjecting the article to a differential of pressure, the lesser pressure being subjected independently of and simultaneously with the application of the heating medium to the opposite sides of the article.

3. The method of vulcanizing articles containing rubber, which consists in treating the article by the application of a heating medium applied simultaneously at opposite sides thereof, and at one side by conduction through a support therefor, while subjecting the article to a differential of pressure, the lesser pressure being subjected independently of and simultaneously with the application of the heating medium applied by conduction.

4. The method of vulcanizing articles containing rubber, which consists in treating the article by the application of steam applied directly upon one side thereof and upon a support for and thence by the heat of conduction to the opposite side of said article, while subjecting the article to a differential of pressure, the lesser pressure being subjected independently of and simultaneously with the application of the heating medium applied by conduction.

Signed at New York, county of New York and State of New York, this 8th day of April, 1918.

CHARLES E. BRADLEY.